US011403850B2

(12) United States Patent
Chen et al.

(10) Patent No.: US 11,403,850 B2
(45) Date of Patent: Aug. 2, 2022

(54) SYSTEM AND METHOD FOR PROVIDING UNSUPERVISED DOMAIN ADAPTATION FOR SPATIO-TEMPORAL ACTION LOCALIZATION

(71) Applicant: Honda Motor Co., Ltd., Tokyo (JP)

(72) Inventors: Yi-Ting Chen, Sunnyvale, CA (US); Behzad Dariush, San Ramon, CA (US); Nakul Agarwal, Merced, CA (US); Ming-Hsuan Yang, Merced, CA (US)

(73) Assignee: Honda Motor Co., Ltd., Tokyo (JP)

( * ) Notice: Subject to any disclaimer, the term of this patent is extended or adjusted under 35 U.S.C. 154(b) by 71 days.

(21) Appl. No.: 16/804,949

(22) Filed: Feb. 28, 2020

(65) Prior Publication Data

US 2021/0027066 A1    Jan. 28, 2021

Related U.S. Application Data

(60) Provisional application No. 62/878,085, filed on Jul. 24, 2019.

(51) Int. Cl.
*G06T 7/73* (2017.01)
*G06V 20/40* (2022.01)
(Continued)

(52) U.S. Cl.
CPC ........... *G06V 20/46* (2022.01); *G06K 9/6267* (2013.01); *G06N 3/08* (2013.01); *G06V 20/56* (2022.01)

(58) Field of Classification Search
CPC ............... G05D 1/0088; G05D 1/0221; G05D 2201/0213; G05D 1/00; G05D 1/02;
(Continued)

(56) References Cited

U.S. PATENT DOCUMENTS

2019/0095731 A1*  3/2019  Vernaza ............... G05D 1/0088
2019/0096125 A1*  3/2019  Schulter ............... G05D 1/0088
(Continued)

FOREIGN PATENT DOCUMENTS

WO    WO-2018098161 A1 *  5/2018  ............. G06Q 50/28

OTHER PUBLICATIONS

K. Bousmalis, G. Trigeorgis, N. Silberman, D. Krishnan, and D. Erhan. Domain separation networks. In Advances in Neural Information Processing Systems, pp. 343-351, 2016.
(Continued)

*Primary Examiner* — Quan M Hua
(74) *Attorney, Agent, or Firm* — Rankin, Hill & Clark LLP

(57) ABSTRACT

A system and method for providing unsupervised domain adaption for spatio-temporal action localization that includes receiving video data associated with a surrounding environment of a vehicle. The system and method also include completing an action localization model to model a temporal context of actions occurring within the surrounding environment of the vehicle based on the video data and completing an action adaption model to localize individuals and their actions and to classify the actions based on the video data. The system and method further include combining losses from the action localization model and the action adaption model to complete spatio-temporal action localization of individuals and actions that occur within the surrounding environment of the vehicle.

16 Claims, 7 Drawing Sheets

(51) Int. Cl.
  *G06K 9/62* (2022.01)
  *G06N 3/08* (2006.01)
  *G06V 20/56* (2022.01)

(58) Field of Classification Search
  CPC .... G05D 1/024; G05D 1/0246; G05D 1/0255;
    G05D 1/0257; G05D 1/027; G05D
    1/0278; G05D 1/0223; G05D 1/0274;
    G06N 20/00; G06N 3/006; G06N 3/0454;
    G06N 3/08; G06N 3/084; G06K 9/00791;
    G06K 9/6256; G06K 9/6267; B62D
    15/0255; B60W 50/00; B60W 40/02;
    B60W 40/08; B60W 40/10; B60W 60/00;
    B60W 2050/0083
  See application file for complete search history.

(56) References Cited

U.S. PATENT DOCUMENTS

| | | | | |
|---|---|---|---|---|
| 2019/0147284 | A1* | 5/2019 | Gavrilyuk | G06K 9/3241 382/103 |
| 2019/0147320 | A1* | 5/2019 | Mattyus | G06K 9/627 382/155 |
| 2019/0325595 | A1* | 10/2019 | Stein | G08G 1/166 |
| 2020/0001779 | A1* | 1/2020 | Alexander | G06K 9/00825 |

OTHER PUBLICATIONS

J. Carreira and A. Zisserman. Quo vadis, action recognition? a new model and the kinetics dataset. In proceedings of the IEEE Conference on Computer Vision and Pattern Recognition, pp. 6299-6308, 2017.
M.-H. Chen, Z. Kira, and G. AlRegib. Temporal attentive alignment for video domain adaptation. arXiv preprint arXiv:1905.10861, 2019.
Y. Chen, W. Li, C. Sakaridis, D. Dai, and L. Van Gool. Domain adaptive faster r-cnn for object detection in the wild. In Proceedings of the IEEE Conference on Computer Vision and Pattern Recognition, pp. 3339-3348, 2018.
G. Csurka. A comprehensive survey on domain adaptation for visual applications. In Domain Adaptation in Computer Vision Applications, pp. 1-35. Springer, 2017.
M. Everingham, S. A. Eslami, L. Van Gool, C. K. Williams, J. Winn, and A. Zisserman. The pascal visual object classes challenge: A retrospective. International journal of computer vision, 111(1):98-136, 2015.
Y. Ganin and V. Lempitsky. Unsupervised domain adaptation by backpropagation. In International Conference on Machine Learning, pp. 1180-1189, 2015.
Y. Ganin, E. Ustinova, H. Ajakan, P. Germain, H. Larochelle, F. Laviolette, M. Marchand, and V. Lempitsky. Domain-adversarial training of neural networks. The Journal of Machine Learning Research, 17(1):2096-2030, 2016.
R. Girshick. Fast r-cnn. In Proceedings of the IEEE international conference on computer vision, pp. 1440-1448, 2015.
G. Gkioxari and J. Malik. Finding action tubes. In Proceedings of the IEEE conference on computer vision and pattern recognition, pp. 759-768, 2015.
C. Gu, C. Sun, D. A. Ross, C. Vondrick, C. Pantofaru, Y. Li, S. Vijayanarasimhan, G. Toderici, S. Ricco, R. Sukthankar, et al. Ava: A video dataset of spatio-temporally localized atomic visual actions. In Proceedings of the IEEE Conference on Computer Vision and Pattern Recognition, pp. 6047-6056, 2018.
P. Haeusser, T. Frerix, A. Mordvintsev, and D. Cremers. Associative domain adaptation. In Proceedings of the IEEE International Conference on Computer Vision, pp. 2765-2773, 2017.
K. He, X. Zhang, S. Ren, and J. Sun. Deep residual learning for image recognition. In Proceedings of the IEEE conference on computer vision and pattern recognition, pp. 770-778, 2016.
R. Hou, C. Chen, and M. Shah. Tube convolutional neural network (t-cnn) for action detection in videos. In Proceedings of the IEEE International Conference on Computer Vision, pp. 5822-5831, 2017.
A. Jamal, V. P. Namboodiri, D. Deodhare, and K. Venkatesh. Deep domain adaptation in action space. In BMVC, p. 264, 2018.
H. Jhuang, J. Gall, S. Zuffi, C. Schmid, and M. J. Black. Towards understanding action recognition. In Proceedings of the IEEE international conference on computer vision, pp. 3192-3199, 2013.
V. Kalogeiton, P. Weinzaepfel, V. Ferrari, and C. Schmid. Action tubelet detector for spatio-temporal action localization. In Proceedings of the IEEE International Conference on Computer Vision, pp. 4405-4413, 2017.
W. Kay, J. Carreira, K. Simonyan, B. Zhang, C. Hillier, S. Vijayanarasimhan, F. Viola, T. Green, T. Back, P. Natsev, et al. The kinetics human action video dataset. arXiv preprint arXiv: 1705.06950, 2017.
Y. Ke, R. Sukthankar, M. Hebert, et al. Efficient visual event detection using volumetric features. In ICCV, vol. 1, pp. 166-173. Citeseer, 2005.
J. F. P. Kooij, N. Schneider, F. Flohr, and D. M. Gavrila. Context-based pedestrian path prediction. In European Conference on Computer Vision, pp. 618-633. Springer, 2014.
T.-Y. Lin, P. Goyal, R. Girshick, K. He, and P. Dollár. Focal loss for dense object detection. In Proceedings of the IEEE international conference on computer vision, pp. 2980-2988, 2017.
M. Long, Y. Cao, J. Wang, and M. Jordan. Learning transferable features with deep adaptation networks. In International Conference on Machine Learning, pp. 97-105, 2015.
I. Loshchilov and F. Hutter. Sgdr: Stochastic gradient descent with warm restarts. arXiv preprint arXiv:1608.03983, 2016.
S. Motiian, M. Piccirilli, D. A. Adjeroh, and G. Doretto. Unified deep supervised domain adaptation and generalization. In Proceedings of the IEEE International Conference on Computer Vision, pp. 5715-5725, 2017.
A. Paszke, S. Gross, S. Chintala, G. Chanan, E. Yang, Z. De-Vito, Z. Lin, A. Desmaison, L. Antiga, and A. Lerer. Automatic differentiation in pytorch. 2017.
X. Peng and C. Schmid. Multi-region two-stream r-cnn for action detection. In European conference on computer vision, pp. 744-759. Springer, 2016.
A. Rasouli, I. Kotseruba, and J. K. Tsotsos. Are they going to cross? a benchmark dataset and baseline for pedestrian crosswalk behavior. In Proceedings of the IEEE International Conference on Computer Vision, pp. 206-213, 2017.
S. Ren, K. He, R. Girshick, and J. Sun. Faster r-cnn: Towards real-time object detection with region proposal networks. In Advances in neural information processing systems, pp. 91-99, 2015.
M. D. Rodriguez, J. Ahmed, and M. Shah. Action mach a spatio-temporal maximum average correlation height filter for action recognition. 2008 IEEE Conference on Computer Vision and Pattern Recognition, pp. 1-8, 2008.
K. Saenko, B. Kulis, M. Fritz, and T. Darrell. Adapting visual category models to new domains. In European conference on computer vision, pp. 213-226. Springer, 2010.
S. Saha, G. Singh, M. Sapienza, P. H. Torr, and F. Cuzzolin. Deep learning for detecting multiple space-time action tubes in videos. arXiv preprint arXiv:1608.01529, 2016.
K. Saito, Y. Ushiku, T. Harada, and K. Saenko. Strong-weak distribution alignment for adaptive object detection. In Proceedings of the IEEE Conference on Computer Vision and Pattern Recognition, pp. 6956-6965, 2019.
S. Sankaranarayanan, Y. Balaji, A. Jain, S. Nam Lim, and R. Chellappa. Learning from synthetic data: Addressing domain shift for semantic segmentation. In Proceedings of the IEEE Conference on Computer Vision and Pattern Recognition, pp. 3752-3761, 2018.
O. Sener, H. O. Song, A. Saxena, and S. Savarese. Learning transferrable representations for unsupervised domain adaptation. In Advances in Neural Information Processing Systems, pp. 2110-2118, 2016.
G. Singh, S. Saha, M. Sapienza, P. H. Torr, and F. Cuzzolin. Online real-time multiple spatiotemporal action localisation and prediction. In Proceedings of the IEEE International Conference on Computer Vision, pp. 3637-3646, 2017.

(56) References Cited

OTHER PUBLICATIONS

K. Soomro, A. R. Zamir, and M. Shah. Ucf101: A dataset of 101 human actions classes from videos in the wild. arXiv preprint arXiv:1212.0402, 2012.
D. Tran, L. Bourdev, R. Fergus, L. Torresani, and M. Paluri. Learning spatiotemporal features with 3d convolutional networks. In Proceedings of the IEEE international conference on computer vision, pp. 4489-4497, 2015.
E. Tzeng, J. Hoffman, K. Saenko, and T. Darrell. Adversarial discriminative domain adaptation. In Proceedings of the IEEE Conference on Computer Vision and Pattern Recognition, pp. 7167-7176, 2017.
E. Tzeng, J. Hoffman, N. Zhang, K. Saenko, and T. Darrell. Deep domain confusion: Maximizing for domain invariance arXiv preprint arXiv:1412.3474, 2014.
P. Weinzaepfel, Z. Harchaoui, and C. Schmid. Learning to track for spatio-temporal action localization. In Proceedings of the IEEE international conference on computer vision, pp. 3164-3172, 2015.
P. Weinzaepfel, X. Martin, and C. Schmid. Towards weakly-supervised action localization. arXiv preprint arXiv:1605.05197, 2, 2016.
J. Yuan, Z. Liu, and Y. Wu. Discriminative subvolume search for efficient action detection. In 2009 IEEE Conference on Computer Vision and Pattern Recognition, pp. 2442 2449. IEEE, 2009.
Y. Zou, Z. Yu, B. Vijaya Kumar, and J. Wang. Unsupervised domain adaptation for semantic segmentation via class-balanced self-training. In Proceedings of the European Conference on Computer Vision (ECCV), pp. 289-305, 2018.

\* cited by examiner

SYSTEM AND METHOD FOR PROVIDING UNSUPERVISED DOMAIN ADAPTATION FOR SPATIO-TEMPORAL ACTION LOCALIZATION

CROSS-REFERENCE TO RELATED APPLICATION

This application claims priority to U.S. Provisional Application Ser. No. 62/878,085 filed on Jul. 24, 2019, which is expressly incorporated herein by reference.

BACKGROUND

Spatio-temporal action localization involves the task of localizing actions in both space and time, which requires modeling of both spatial and temporal features. A majority of methods for unsupervised domain adaption have been proposed but many of them incur issues based on exhaustive labeling tasks associated with multiple actors that may be present within a real-world scenarios. In many cases, classifications that are learned assume that the training and test data have been sampled from a same underlying probability distribution. However, this assumption is not true in real-world practical scenarios which may lead to poor performance of classifiers on test data.

BRIEF DESCRIPTION

According to one aspect, a computer-implemented method for providing unsupervised domain adaption for spatio-temporal action localization that includes receiving video data associated with a surrounding environment of a vehicle. The computer-implemented method also includes completing an action localization model to model a temporal context of actions occurring within the surrounding environment of the vehicle based on the video data and completing an action adaption model to localize individuals and their actions and to classify the actions based on the video data. The computer-implemented method further includes combining losses from the action localization model and the action adaption model to complete spatio-temporal action localization of individuals and actions that occur within the surrounding environment of the vehicle.

According to another aspect, a system for providing unsupervised domain adaption for spatio-temporal action localization that includes a memory storing instructions when executed by a processor cause the processor to receive video data associated with a surrounding environment of a vehicle. The instructions also include complete an action localization model to model a temporal context of actions occurring within the surrounding environment of the vehicle based on the video data and complete an action adaption model to localize individuals and their actions and to classify the actions based on the video data. The instructions further include combine losses from the action localization model and the action adaption model to complete spatio-temporal action localization of individuals and actions that occur within the surrounding environment of the vehicle.

According to yet another aspect, a non-transitory computer readable storage medium storing instructions that when executed by a computer, which includes a processor perform a method that includes receiving video data associated with a surrounding environment of a vehicle. The computer-implemented method also includes completing an action localization model to model a temporal context of actions occurring within the surrounding environment of the vehicle based on the video data and completing an action adaption model to localize individuals and their actions and to classify the actions based on the video data. The computer-implemented method further includes combining losses from the action localization model and the action adaption model to complete spatio-temporal action localization of individuals and actions that occur within the surrounding environment of the vehicle.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
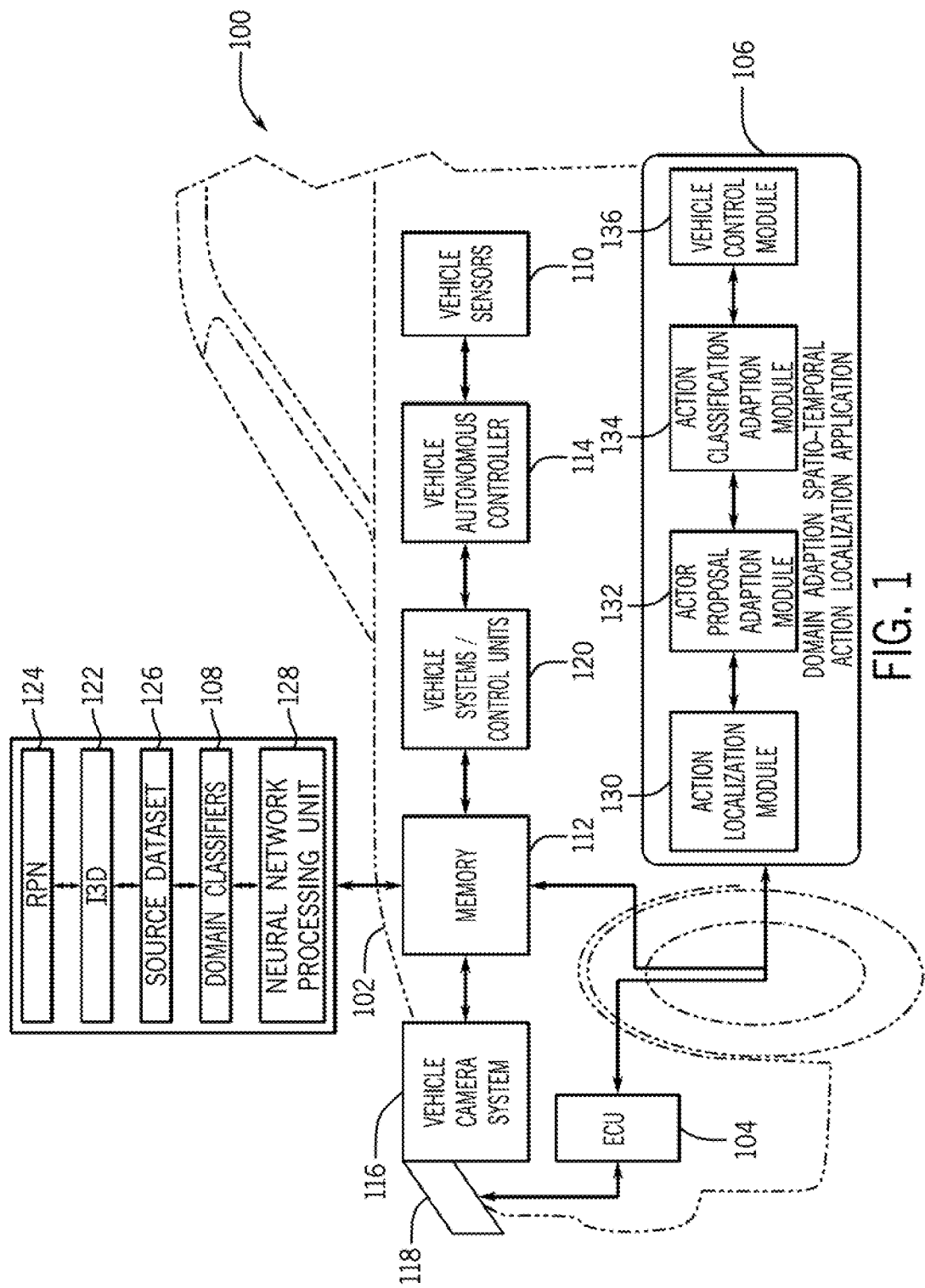
FIG. 1 is a schematic view of an exemplary operating environment for implementing systems and methods for providing unsupervised domain adaption for spatio-temporal action localization according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary operating environment 100 for implementing systems and methods for providing unsupervised domain adaption for spatio-temporal action localization according to an exemplary embodiment of the present disclosure. The components of the environment 100, as well as the components of other systems, hardware architectures, and software architectures discussed herein, may be combined, omitted, or organized into different architectures for various embodiments.

Generally the environment 100 includes an ego vehicle (vehicle) 102 with an electronic control unit (ECU) 104 that executes one or more applications, operating systems, vehicle system and subsystem user interfaces, among others. The ECU 104 may also execute a domain adaption spatio-temporal action localization application (domain adaption application) 106 that may be configured to provide unsupervised domain adaption for spatio-temporal action localization of actors (individuals) that are located within a surrounding environment of the vehicle 102. The domain adaption application 106 may be configured to utilize one or more contextual datasets (e.g., available pre-trained datasets) as a contextual source (source domain) that may be include classified actions of one or more individuals that occur in one or more contexts.

The source domain may be associated with various contexts/settings/environments and may not particularly be associated with a vehicular environment/setting, roadway settings. For example, the source domain may include activity classifications in a home environment, a sports environment, a commercial environment, and additional non-vehicular environments/settings. Such activity classifications may pertain to poses of individuals such as standing, running, and walking. Such classifications may also pertain to individual interactions with objects, including, but not limited to, looking at a mobile phone (not shown), talking on the mobile phone, carrying/holding an object. Additionally, such classifications may pertain to individual to individual interactions that may include but may not be limited to, individuals speaking amongst one another in a non-vehicular environment/setting.

The domain adaption application 106 may accordingly be configured to adapt the source data to be utilized to classify actions of one or more individuals (e.g., pedestrians) that may be captured within vehicular environment/settings within one or more target images of the surrounding environment of the vehicle 102 (target domain). The domain adaption application 106 may bridge the gap between the source domain and the target domain collected from different environments/settings (e.g., non-vehicular settings/environments vs. vehicular settings/environments). Accordingly the domain adaption application 106 may enable actions of individuals that are located within the surrounding environment of the vehicle 102 to be classified based on source data that may be based on pre-trained contextual datasets that may be prepared by third parties. The application 106 may thereby allow avoiding annotations of one or more datasets that specifically pertain to vehicular environments.

Figure 2:
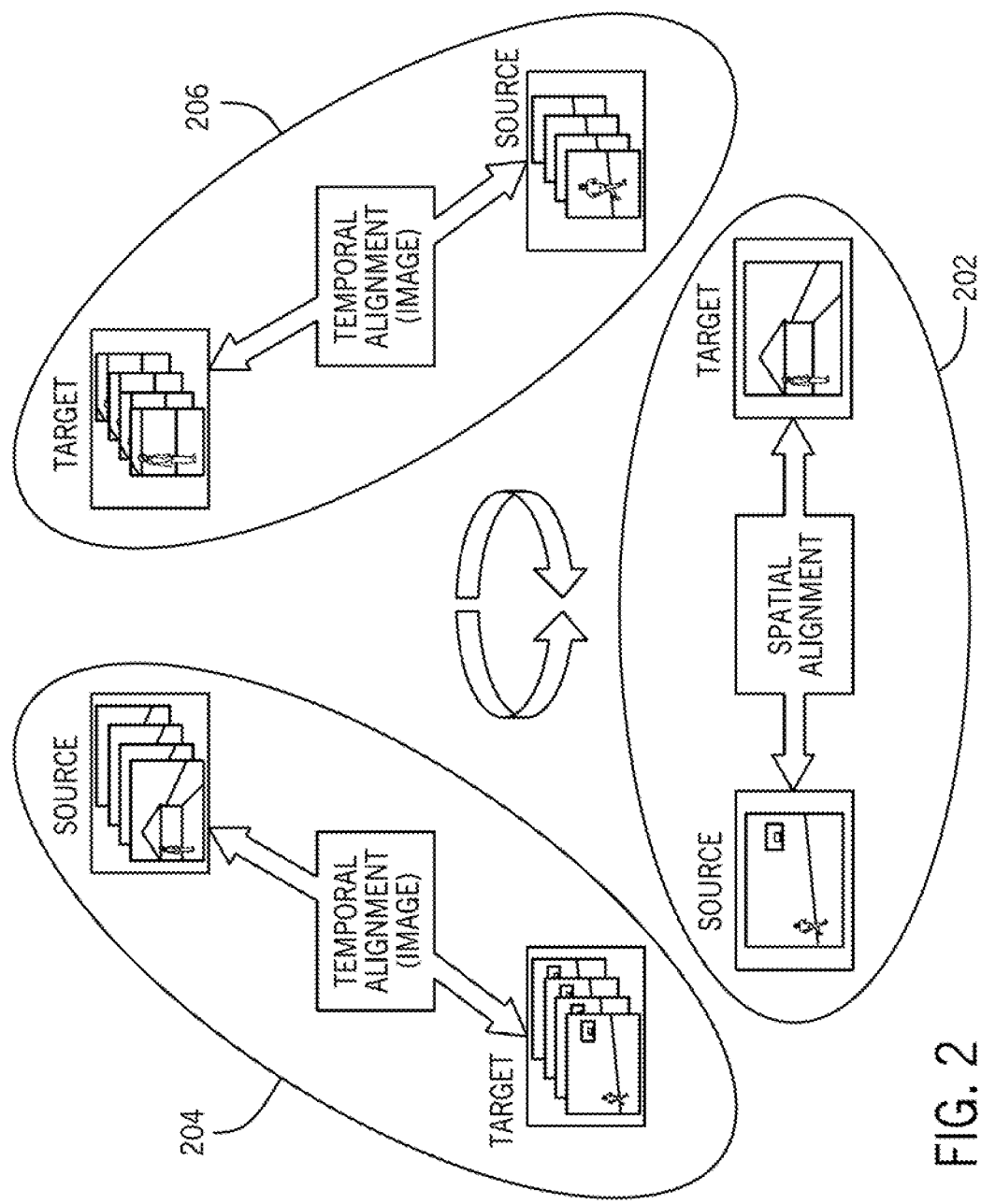
FIG. 2 is an illustrative embodiment of a general technique for spatio-temporal action localization according to an exemplary embodiment of the present disclosure.

In an exemplary embodiment, the domain adaption application 106 may include an end-to-end unsupervised domain adaption framework that is based on a faster R-CNN algorithm, known in the art, for spatio-temporal action localization of one or more individuals that may be located within the surrounding environment of the vehicle 102. With reference to FIG. 2, an illustrative embodiment of a general technique for spatio-temporal action localization, the domain adaption application 106 may be configured to align both spatial and temporal features between the source action localization and target action localization. As shown, the domain adaption application 106 may be configured to align spatial features 202 between the source actions and the target actions at an image level. Additionally, as discussed in more detail below, the domain adaption application 106 may be configured to align temporal features at an image level 204 and at an instance level 206 between the source actions and the target actions to thereby classify one or more target actions of individuals that are located within the surrounding environment of the vehicle 102.

With continued reference to FIG. 1, as discussed in more detail below, the domain adaption application 106 may include a plurality of modules for aligning temporal features at the image level between the source domain and the target domain, for aligning temporal features at the instance level between the source domain and the target domain, and for aligning spatial features at the image level between the source domain and the target domain. The domain adaption application 106 may thereby employ adversarial training to learn domain-invariant features associated with individual actions that may occur within a vehicular environment, including, but not limited to the surrounding environment of the vehicle 102. In one or more embodiments, the domain adaption application 106 may be configured to utilize classified target actions of one or more individuals that are located within the surrounding environment of the vehicle 102 to determine one or more driving control decisions that may be based on one or more atomic actions of the one or more individuals.

For example, the domain adaption application 106 may analyze classified actions of the individuals to determine if the path of the individual may intercept with the vehicle 102, if the individual is aware of the presence of the vehicle 102, if the individual is expected to approach the vehicle 102, and the like. In one configuration, the domain adaption application 106 may be configured to provide commands to autonomously control the vehicle 102 to preemptively adapt to the positions, locations, and/or potential overlap between one or more individuals based on classified actions.

With continued reference to FIG. 1, in addition to the ECU 104, the vehicle 102 may also include a plurality of additional components, for example, vehicle sensors 110, a memory 112, a vehicle autonomous controller 114, a vehicle camera system 116, one or more cameras 118, and a vehicle systems/control units 120. In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the vehicle 102.

The ECU 104 may also include a communication device (not shown) for sending data internally within (e.g., between one or more components) the vehicle 102 and communicating with externally hosted computing systems (e.g., external to the vehicle 102). Generally, the ECU 104 may communicate with the memory 112 to execute the one or more applications, operating systems, vehicle system and subsystem user interfaces, and the like that are stored within the memory 112.

In one embodiment, the ECU 104 may communicate with the vehicle autonomous controller 114 to execute autonomous driving commands to operate the vehicle 102 to be fully autonomously driven or semi-autonomously driven in a particular manner that may be based on one or more classified target actions of one or more respective individuals located within the surrounding environment of the vehicle 102. In some cases, the autonomous driving commands may also be executed to operate the vehicle 102 and/or one or more external factors to be fully autonomously driven or semi-autonomously driven in a particular manner that may be based on one or more additional factors that may include, but may not be limited to, a lane in which the vehicle 102 is traveling, status of traffic signals, traffic patterns, traffic regulations, etc.

In one or more embodiments, the vehicle autonomous controller 114 may be configured to provide the one or more commands to one or more of the vehicle systems/control units 120 to provide full autonomous or semi-autonomous control of the vehicle 102. Such autonomous control of the vehicle 102 may be provided by sending one or more commands to control one or more of the vehicle systems/control units 120 to operate (e.g., drive) the vehicle 102 during one or more circumstances (e.g., when providing driver assist controls), and/or to fully control driving of the vehicle 102 during an entire trip of the vehicle 102.

The one or more commands may be provided to one or more vehicle systems/control units 120 that include, but are not limited to an engine control unit, a braking control unit, a transmission control unit, a steering control unit, and the like to control the vehicle 102 to be autonomously driven based on data communicated by the domain adaption application 106. As such, the vehicle 102 may be autonomously or semi-autonomously operated based on the classified target actions of the one or more individuals that may be located within the surrounding environment of the vehicle 102.

In one embodiment, the domain adaption application 106 may be configured to communicate with the ECU 104 and/or the one or more vehicle systems/control units 120 to provide warnings/alerts to a driver of the vehicle (e.g., if the vehicle 102 is being driven by a driver and not autonomously) for safety enhancement purposes based on the classified target actions of the one or more individuals that may be located within the surrounding environment of the vehicle 102.

The vehicle systems/control units 120 may also include Advanced Driver Assistance Systems (ADAS), for example, an adaptive cruise control system, a blind spot monitoring system, a collision mitigation system, a lane departure warning system, among others (not individually shown) that may be utilized to provide warnings/alerts to the driver of the vehicle 102 (e.g., in a circumstance that the vehicle 102 is being driven by a driver and not being fully autonomously controlled) for preemptive safety purposes based on the classified target actions of the one or more individuals that may be located within the surrounding environment of the vehicle 102 as determined through domain adaption spatio-temporal action localization between the source actions and the target actions.

In one embodiment, the vehicle systems/control units 120 may be operably connected to vehicle sensors 110 of the vehicle 102. The vehicle sensors 110 may include, but are not limited to, sensors associated with the vehicle systems/control units 120 and other sensors associated with one or more electronic components and/or mechanical components (not shown) of the vehicle 102. In one or more embodiments, one or more of the vehicle sensors 110 may provide sensor data to the vehicle autonomous controller 114 to be utilized in addition to data that is communicated by the domain adaption application 106 to autonomously control the vehicle 102.

In one configuration, the memory 112 of the vehicle 102 may be configured to store one or more executable files associated with one or more operating systems, applications, associated operating system data, application data, vehicle system and subsystem user interface data, and the like that are executed by the ECU 104. In one or more embodiments, the memory 112 of the vehicle 102 may be accessed by the domain adaption application 106 to store domain classifiers 108 associated with spatial alignment and temporal alignment between source actions and target actions determined based on the source domain and target domain.

With continued reference to FIG. 1, the vehicle camera system 116 may include one or more of the cameras 118 that may be positioned in one or more directions and at one or more areas to capture one or more images of the surrounding environment of the vehicle 102. The one or more cameras 118 of the vehicle camera system 116 may be disposed at external front portions of the vehicle 102, including, but not limited to different portions of the vehicle dashboard, vehicle bumper, vehicle front lighting units, vehicle fenders, and the windshield. In one embodiment, the one or more cameras 118 may be configured as RGB cameras that may capture RGB bands that are configured to capture rich information about object appearance, as well as relationships and interactions between the vehicle 102 and objects within the surrounding environment of the vehicle 102.

In other embodiments, the one or more cameras 118 may be configured as stereoscopic cameras that are configured to capture environmental information in the form three-dimensional images. In one or more configurations, the one or more cameras 118 may be configured to capture one or more first person viewpoint RGB images/videos of the surrounding environment of the vehicle 102. The vehicle camera system 116 may be configured to convert one or more RGB images/videos (e.g., sequences of images) into image data that is communicated to the domain adaption application 106 to be analyzed.

As discussed, the image data that may be provided by the vehicle camera system 116 to the domain adaption application 106 may be further evaluated and processed based on the utilization of a plurality of neural networks 122, 124 that may be configured to receive particular inputs of data and to output respective data that may be utilized to complete spatio-temporal action localization and classification between the source actions and target actions. As discussed, the spatio-temporal action localization may be based on domain adaption at an image level (temporal and spatial) based on image data that may be provided by the vehicle camera system 116 and at an instance level (temporal) that may be utilized to minimize domain shift to localize and classify one or more target actions of one or more individuals located within the surrounding environment of the vehicle 102.

In an exemplary embodiment, the plurality of neural networks 122, 124 may include, but may not be limited to, a I3D convolutional neural network (I3D) 122 and a reason proposal network (RPN) 124. The plurality of neural networks 122, 124 may be operably controlled by a neural network processing unit 128. The neural network processing unit 128 may be configured to provide processing capabilities to be configured to utilize machine learning/deep learning to provide artificial intelligence capabilities that may be utilized to output data by each of the plurality of neural networks 122, 124 to the domain adaption application 106. The neural network processing unit 128 may process information that is provided as inputs and may access one or more datasets to provide various functions, that may include, but may not be limited to, importance scoring, feature recognition and scoring, computer vision, speed recognition, machine translation, path prediction, autonomous driving commands, and the like.

In an exemplary embodiment, the I3D 122 includes fully connected layers. The fully connected layers may be configured to recognize and classify images for computer vision. The I3D 122 may complete convolution, pooling, and may break down one or more images/video into features. The I3D 122 may utilize the fully connected layers to analyze the source domain to determine a final classification decision with respect to target actions of individuals within the target domain. The I3D 122 may be configured to capture appearance and temporal dynamics of input video frames provided by the vehicle camera system 116.

To complete spatio-temproal action localization based on the source domain and the target domain, the domain adaption application 106 may be configured to adapt both types of features. In one configuration, the I3D 122 may be configured to receive video a plurality of anchor boxes upon one or more objects that may be located within the surrounding environment of the vehicle 102 as included within the target frame(s) of length T frames and generate a corresponding temporal feature representation using the TF feature extractor.

In an exemplary embodiment, the RPN 124 may be configured to receive one or target frames as inputs of the target domain. The RPN 124 may be configured as a faster R-CNN network that may analyze the target domain against source domain that is retrieved from a source dataset 126. In one embodiment, the domain adaption application 106 may be configured to use a 2D resNet-50 model as a spatial encoder SF on a keyframe K (e.g., middle frame) as an input for the RPN 124. In one or more embodiments, outputs from the I3D 122 and the RPN 124 may be inputted for region of interest pooling to obtain a fixed sized representation of an actor RPN proposals with respect to individuals that are located within the surrounding environment of the vehicle 102.

II. The Domain Adaption Spatio-Temporal Action Localization Application and Related Methods Components of the domain adaption application 106 will now be described according to an exemplary embodiment and with reference to FIG. 1. In an exemplary embodiment, the domain adaption application 106 may be stored on the memory 112 and executed by the ECU 104 of the vehicle 102. In another embodiment, the domain adaption application 106 may be stored on an externally hosted computing infrastructure (not shown) and may be accessed by a communication device (not shown) of the vehicle 102 to be executed by the ECU 104 of the vehicle 102.

The general functionality of domain adaption application 106 will now be discussed. In an exemplary embodiment, the domain adaption application 106 may include an action localization module 130, an actor proposal adaption module 132, an action classification adaption module 134, and a vehicle control module 136. However, it is appreciated that the domain adaption application 106 may include one or more additional modules and/or sub-modules that are included in lieu of the modules 130-136.

Figure 3:
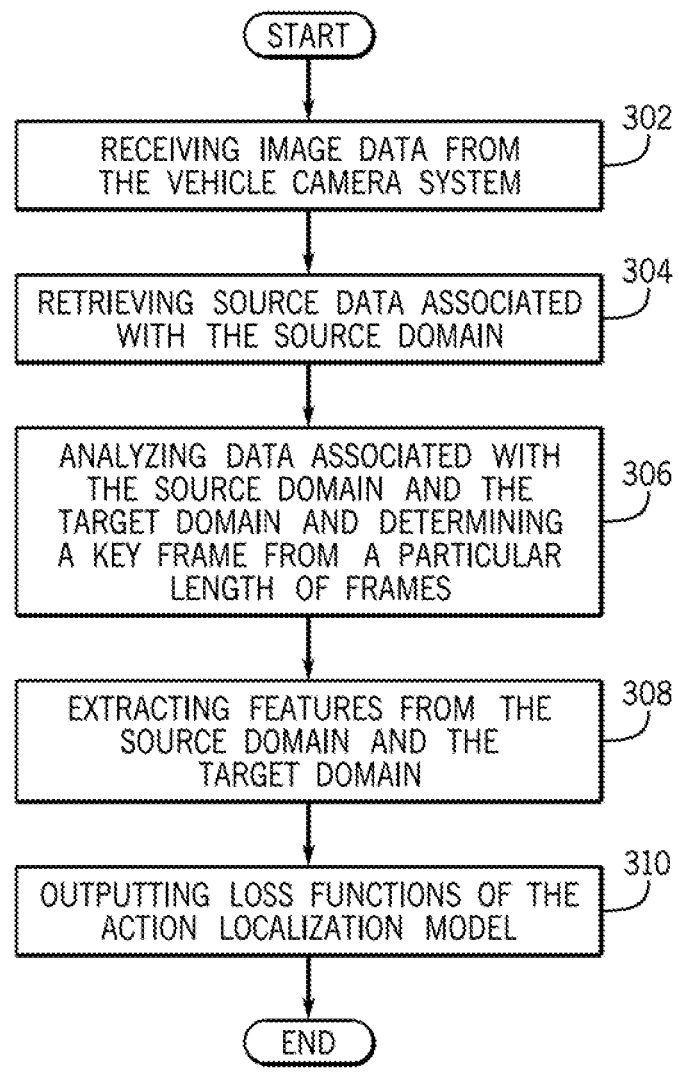
FIG. 3 is a process flow diagram of a method for completing action localization to model a temporal context of one or more actions occurring between the source domain and the target domain within the surrounding environment of the vehicle according to an exemplary embodiment of the present disclosure.

FIG. 3 is a process flow diagram of a method 300 for completing action localization to model a temporal context of one or more actions occurring between the source domain and the target domain within the surrounding environment of the vehicle 102 according to an exemplary embodiment of the present disclosure. FIG. 3 will be described with reference to the components of FIG. 1 and FIG. 2 though it is to be appreciated that the method 300 of FIG. 3 may be used with other systems/components.

The method 300 may begin at block 302, wherein the method 300 may include receiving image data from the vehicle camera system 116. In an exemplary embodiment, the action localization module 130 of the domain adaption application 106 may be configured to communicate with the vehicle camera system 116 to receive image data associated with the target domain (e.g., the surrounding environment of the vehicle 102). As discussed above, the image data may pertain pertains to one or more RGB images/video of the surrounding environment of the vehicle 102 that are captured by one or more cameras 118 that are operably connected to the vehicle camera system 116. In some embodiments, the action localization module 130 may package and store the image data on the memory 112 to be evaluated at one or more points in time.

The method 300 may proceed to block 304, wherein the method 300 may include retrieving source data associated with the source domain. In an exemplary embodiment, the action localization module 130 may be configured to access the source dataset 126 that may be stored on the memory 112 of the vehicle 102. The source dataset 126 may be configured to store various forms of source data that may be associated with various source domains. In one configuration, the source data may include image data that includes classifiers that may be based on annotations of actions that occurred within various source domains. For example, the source data may include image data that includes bounding boxes that are associated within individuals and associated action classifiers that pertain to classified actions of the individuals within the particular domain (e.g., sports— running).

The method 300 may proceed to block 306, wherein the method 300 may include analyzing data associated with the source domain and the target domain and determining a key frame from a particular length of frames. In an exemplary embodiment, the action localization module 130 may be configured to analyze the image data included within the source domain and the target domain to determine a plurality of RGB image clips. The RGB image clips may include spliced sectionalized image clips of an entire video of a length that pertains to a predetermined period of time (e.g., 7 seconds). Each of the RGB image clips may include an n number of pixels that include portions of the surrounding environment of the vehicle 102 as captured within the RGB images/video by the camera(s) 118 of the vehicle camera system 116. The action localization module 130 may be further configured to determine image frames that are included within the RGB image clips.

In an exemplary embodiment, the action localization module 130 may select a key frame from the image frames that are included within the RGB image clips. In one configuration, the key frame may include a middle frame (in the online detection setting) of the image frames that are included within the RGB image clips 208. In another configuration, the key frame may include a last frame (in the online detection setting) of the image frames that are included within the RGB image clips 208.

The method 300 may proceed to block 308, wherein the method 300 may include extracting features from the source domain and the target domain. In one embodiment, the action localization module 130 may input the image data from the vehicle camera system 116 and image data from source domain to the I3D 122 to be analyzed by the I3D 122. In particular, the I3D 122 may take a video V or length T frames and generate a corresponding temporal feature representation TF using a feature extractor with respect to the key frames of the source domain and the target domain. The feature extractor may be further decomposed into $TF_1$ and $TF_2$. In one configuration, $TF_1$ may temporally flatten the features from a fused mixed_4f layer of the I3D 122. The flattened features may have a spatial and temporal stride of n pixels and n frames. For example, the flattened features may have a spatial and temporal stride of 16 pixels and 4 frames, respectively. $TF_2$ may also be analyzed as an action classifier. Accordingly, a compact representation of the target domain as an entire input sequence associated with the surrounding environment of the vehicle 102 is utilized by the domain adaption application 106.

In one embodiment, data associated with the key frame of the target domain and the key frame of the source domain may be utilized to generate an action proposal using a 3DResnet-50 model as a spatial encoder SF on the keyframe K as an input for the RPN 124. In one configuration, the proposals may be generated using a conv4 block of ResNet. The action localization module 130 may use actor RPN proposals on $TF_1$ (V) and may complete ROI polling to obtain a fixed length representation of a particular size (e.g., 7×7×832). This feature representation is passed through $TF_2$, as an action classifier that includes the remaining I3D layers upon mixed_5c and an average pooling layer which outputs 1×1×1024 feature. This feature may be used to learn a linear classifier for actions and a regressor for bounding box offsets.

The method 300 may proceed to block 310, wherein the method 300 may include outputting loss functions of the action localization model. In one embodiment, the action localization module 130 may utilize adversarial learning by using a Gradient Reversal Layer (GRL) on intermediate feature representations for aligning feature distribution between the source domain and the target domain. The GRL may pass data to a domain classifier network $D_s$ 312 to align spatial features generated by the SF using ResNet. In one embodiment, the loss function used to train the network may be formulated as:

$$\mathcal{L}_{act} = \mathcal{L}_{rpn} + \mathcal{L}_{cls} \mathcal{L}_{reg}$$

where $\mathcal{L}_{rpn}$, $\mathcal{L}_{cls}$, $\mathcal{L}_{reg}$ are the loss functions for the RPN 124. In an exemplary embodiment, upon localizing the actions within the source domain and the target domain, the action localization module 130 may communicate data pertaining to the localized actions to the vehicle control module 136. In one embodiment, the action localization module 130 may communicate data pertaining to the loss functions of the action localization model to the vehicle control module 136 to be combined with the losses from domain adaption, discussed below.

Figure 4:
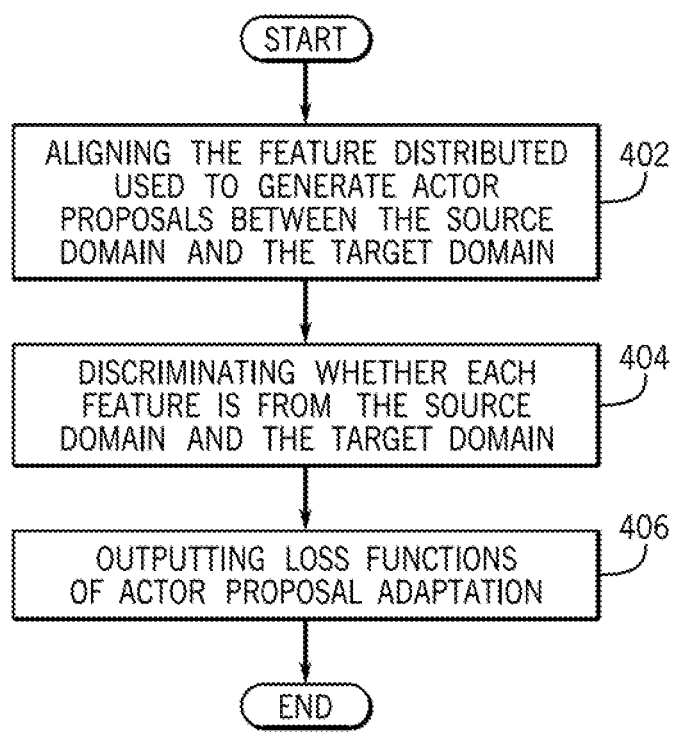
FIG. 4 is a process flow diagram of a method for performing actor proposal adaption according to an exemplary embodiment of the present disclosure.

FIG. 4 is a process flow diagram of a method 400 for performing actor proposal adaption according to an exemplary embodiment of the present disclosure. FIG. 4 will be described with reference to the components of FIG. 1 and FIG. 2 though it is to be appreciated that the method 400 of FIG. 4 may be used with other systems/components. In an exemplary embodiment, the domain adaption application 106 may divide the domain adaption into two steps, actor proposal adaption and action adaption, which exploit the spatial and temporal features respectively. The method 400 pertains to the actor proposal adaption as processed by the actor proposal adaption module 132 of the domain adaption application 106. The method 400 may begin at block 402, wherein the method 400 may include aligning the feature distributed used to generate actor proposals between the source domain and the target domain.

As discussed, upon localizing the actions within the source domain and the target domain, the action localization module 130 may communicate data pertaining to the localized actions to the actor proposal adaption module 132. The actor proposal adaption module 132 may be configured to localize the actors (individuals) that conduct the localized actions by aligning the feature distribution used to generate the actor proposals. In other words, the actor proposal adaption module 132 may be configured to align the distribution of source features and target features.

The method 400 may proceed to block 404, wherein the method 400 may include discriminating whether each feature is from the source domain and the target domain. In one embodiment, the actor proposal adaption module 132 may be configured to utilize the encoder backbone SF. The actor proposal adaption module 132 may append a spatial domain discriminator $D_s$ after SF to discriminate whether the feature SF(K) is from the source domain or the target domain. In one configuration, the domain classifier 108 may be trained to classify various hard-to-classify examples with respect to the classification of the domain to prevent strong alignment of global features during domain shift.

The method 400 may proceed to block 406 wherein the method 400 may include outputting loss functions of actor proposal adaption. In an exemplary embodiment, the loss is based on domain label d of the input image, where d=0 refers to K from the source domain and d=1 refers to K from the target domain. The estimated probability by $D_s$ for the class with label d=1 is denoted by P∈[0,1] where P is defined as:

$$P = \begin{cases} D_s(SF(K)), & \text{if } d = 1 \\ 1 - D_s(SF(K)), \end{cases}$$

otherwise, the action classification adaption module 134 formulates the spatial discriminator loss function as:

$$\mathcal{L}_{D_s} = -\left(\frac{1}{n_s}\sum_{i=1}^{n_s}(1-P_i^s)^\gamma \log(P_i^s) + \frac{1}{n_t}\sum_{i=1}^{n_s}(P_j^t)^\gamma \log(1-P_j^t)\right)$$

where $n_s$ denotes the number of source domain samples and $n_t$ denotes the number of target domain samples in a mini-batch and γ controls the weight on certain hard to classify examples.

In an exemplary embodiment, another GRL may be placed between the spatial domain discriminator $D_s$ and spatial feature extractor SF. The SF may thereby produce domain invariant features SF(K) that may analyzed by the discriminator while $D_s$ distinguishes the features between the source domain and the target domain. In one or more embodiments, the actor proposal adaption module 132 may thereby determine actor proposals pertaining to the source domain and the target domain based on the data provided by the GRL and may thereby communicate respective data to the action classification adaption module 134. The actor proposal may additional communicate data pertaining to the loss functions of actor proposal adaption to the vehicle control module 136 to be further utilized to localize one or more individuals that may be located within the surrounding environment of the vehicle 102.

Figure 5:
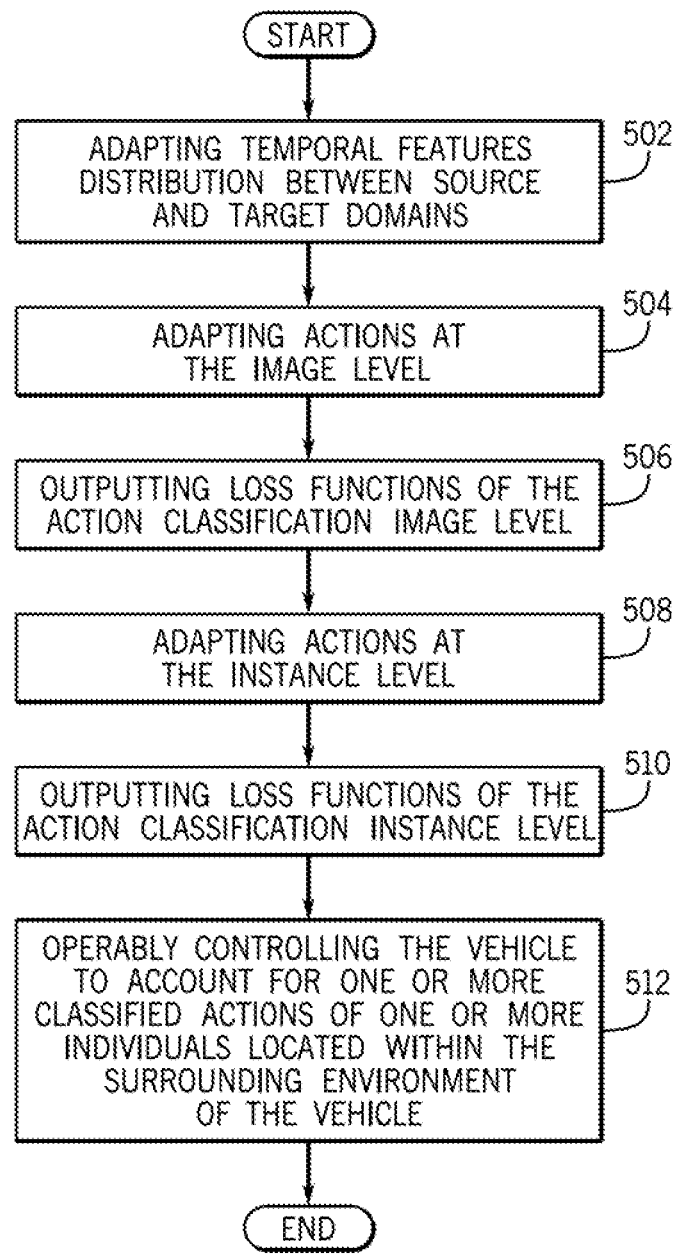
FIG. 5 is a process flow diagram of a method for performing action adaption according to an exemplary embodiment of the present disclosure.

FIG. 5 is a process flow diagram of a method 500 for performing action adaption according to an exemplary embodiment of the present disclosure. FIG. 5 will be described with reference to the components of FIG. 1 and FIG. 2 though it is to be appreciated that the method 500 of FIG. 5 may be used with other systems/components. The method 500 may begin at block 502, wherein the method 500 may include adapting temporal features distribution between source and target domains. In one embodiment, upon receiving data pertaining to the actor proposals from the actor proposal adaption module 132, the action classification adaption module 134 may be configured to classify actions of the actors proposed from the source domain and the target domain.

In an exemplary embodiment, the action classification adaption module 134 may be configured to adapt the temporal features at both the image level and the instance level. Specifically, the action classification adaption module 134 may use $TF_1$ as a feature extractor for adaption at the image level and $TF_2$ for adaption at the instance level. In one configuration, since the action localization module 130 builds a representation based on the key frames $K^s$ and $K^T$ respectively, as discussed with respect to the method 300 above, the action classification adaption module 134 utilizes the benefits of aligning both the image level and the instance level representation in the case of images for action adaption as well.

The method 500 may proceed to block 504, wherein the method 500 may include adapting actions at the image level. In an exemplary embodiment, the action classification adaption module 134 may be configured to perform adaption at the image level by appending a temporal domain discriminator $D_{T_{img}}$ after $TF_1$. Another GRL may be placed in between the $D_{T_{img}}$ and $TF_1$ as an image based temporal domain classifier. In one configuration, the $TF_1$ feature extractor may take a video clip V of T frames and may generate a compact feature representation $TF_1(V)$ comprising a single frame using temporal pooling.

The temporal domain discriminator $D_{Timg}$ may further take $TF_1(V)$ as an input and may output a 3D domain classification map (e.g., 2D domain prediction) $Q=D_{Timg}(TF_1(V)) \in \mathbb{R}^{H \times W}$. The parameters H and W may be determined based on the resolution of the input video V as the spatial strides of $TF_1$ and $D_{Timg}$ are fixed.

The method 500 may proceed to block 506, wherein the method 500 may include outputting loss functions of the action classification image level. In an exemplary embodiment, the action classification adaption module 134 may be configured to apply binary-cross entropy (BCE) loss on Q based on the domain label d of the input video V, where d=0 if V belongs to the source domain, and d=1 if V belongs to the target domain. The loss function for $D_{Timg}$ may be formulated as:

$$\mathcal{L}_{D_{Timg}} = -\left(\frac{1}{n_s}\sum_{i=1}^{n_s}\sum_{h,w}(1-d_i)\log(1-Q_i^{h,w}) + \frac{1}{n_t}\sum_{j=1}^{n_s}\sum_{h,w}d_j\log Q_i^{h,w}\right),$$

where h and w correspond to the spatial indices of an activation in Q. In an exemplary embodiment, the action classification adaption module 134 may communicate data pertaining to the loss functions of the action classification image level to the vehicle control module 136 to combine the loss functions with the loss functions from the action localization model and the domain adaption instance level, discussed below.

The method 500 may proceed to block 508, wherein the method 500 may include adapting actions at the instance level. In an exemplary embodiment, the instance level representation generated by $TF_2$ feature extractor refers to the ROI-based feature vectors before they are fed to final category classifiers of a fully connected layer. A temporal domain discriminator $D_{Tinst}$ takes the feature vector $TF_2(TF_1(V))$ as an input and outputs a domain classification output for the k-th region proposal in the i-th image as $R_{i,k}$.

The method 500 may proceed to block 510, wherein the method 500 may include outputting loss functions of the action classification instance level. In an exemplary embodiment, the action classification adaption module 134 may be configured to apply BCE to generate a final output with respect to adapting actions at the instance level. The corresponding loss function may be formulated as:

$$\mathcal{L}_{D_{Tinst}} = -\left(\frac{1}{n_s}\sum_{i=1}^{n_s}\sum_{k}(1-d_i)\log(1-R_{ik}) + \frac{1}{n_t}\sum_{j=1}^{n_t}\sum_{k}d_j\log R_{j,k}\right),$$

where d=0 if V belongs to the source distribution and d=1 if V belongs to the target distribution. In an exemplary embodiment, the action classification adaption module 134 may communicate data pertaining to the loss functions of the action classification instance level to the vehicle control module 136 to combine the loss functions from the loss functions from the action localization model and the domain adaption image level, discussed above.

As discussed above, the action localization module 130 may communicate data pertaining to the loss functions of the action localization model to the vehicle control module 136. Additionally, the action classification adaption module 134 may communicate data pertaining to the loss functions pertaining to the action classification models to the vehicle control module 136. In an exemplary embodiment, the vehicle control module 136 may configured to combine the losses from the action localization model and the action classification models to determine an overall adversarial loss pertaining to domain adaption. The overall adversarial loss from domain adaption components may be denoted as:

$$\mathcal{L}_{adv} = (SF,TF,D) = \mathcal{L}_{D_s}\mathcal{L}_{D_{Timg}} + L_{D_{Tinst}}$$

For the adaption tasks s→t, given the source video $V^s$ and the target video $V^t$ and by extension their corresponding key frames $K^s$ and $K^T$ respectively, the overall min-max loss function of the fame is defined as:

$$\mathcal{L}(V^s,K^s,V^t,K^T) = \mathcal{L}_{act} + \lambda + \mathcal{L}_{adv},$$

where $\lambda$ is a weight applied to the adversarial loss that balances the localization loss. In an exemplary embodiment, upon the output of the overall adversarial loss, the vehicle control module 136 the vehicle control module 136 may classify one or more target actions of individuals that are located within the surrounding environment of the vehicle 102. In some configurations, the vehicle control module 136 may additionally analyze the loss functions of the actor proposal adaption to localize and determine a position of the one or more individuals that are located within the surrounding environment of the vehicle 102 with respect to the location of the vehicle 102.

The method 500 may proceed to block 512, wherein the method 500 may include operably controlling the vehicle 102 to account for one or more classified actions of one or more individuals located within the surrounding environment of the vehicle 102. In an exemplary embodiment, based on the classification of one or more target actions of one or more individuals, the vehicle control module 136 may determine if one or more individuals may be located within a perspective path of the vehicle 102 and/or if the individuals are aware of the presence of the vehicle 102 based on their respective actions. In particular, the vehicle control module 136 may evaluate the localized position and the classified actions of one or more individuals that may include walking, talking, looking downwards, looking towards the vehicle 102, looking away from the vehicle 102, and the like to determine if the individual(s) may be located within a perspective path of the vehicle 102 and/or if the individual(s) may be aware of the presence of the vehicle 102 (e.g., looking toward the vehicle 102). In one embodiment, the vehicle control module 136 may assign an importance score that may be associated with each individual based on their location and classified action associated with their path and awareness of the vehicle 102.

In one embodiment, upon assigning the importance score that may be associated with each individual, the vehicle control module 136 may compare the importance score for each individual to a predetermined importance score threshold value. The predetermined importance score threshold value may pertain to individuals and their associated actions that may have a respective degree of influence with respect to the driving/operation of the vehicle 102. In one embodiment, upon comparing the importance score for each individual to the predetermined importance score threshold value, the vehicle control module 136 may determine a ranking of importance of the important objects based on a scale of highest to lowest importance scores that were assigned to the respective individuals located within the surrounding environment of the vehicle 102. For example, individuals that may be determined to be located within a path of the vehicle 102 and/or that may be determined to be looking away from the vehicle 102 may be ranked higher than an important individual that may need to be accordingly accounted for with respect to the operation of the vehicle 102.

In one or more embodiment, upon ranking the importance of the individuals, the vehicle control module 136 may be configured to communicate one or more commands (e.g., data signals) to the vehicle autonomous controller 114 and/or the ECU 104 to autonomously control the vehicle 102 to account for the one or more important individuals. In some circumstances, the one or more important individuals may be accounted for based on the ranked importance of the important individuals.

The vehicle control module 136 may determine one or more actions with respect to vehicle autonomous control 228 of the vehicle 102 to operate the vehicle 102 in a manner that is influenced by the locations and action classifications of one or more important individuals that are located within the surrounding environment of the vehicle 102. More specifically, the vehicle 102 may be controlled to execute one or more actions that may be conducted in a particular manner(s) (e.g., with the application of a particular speed, acceleration, steering angle, throttle angle, braking force, etc.) to account for the one or more important individuals that are located within the surrounding environment of the vehicle 102.

Figure 6:
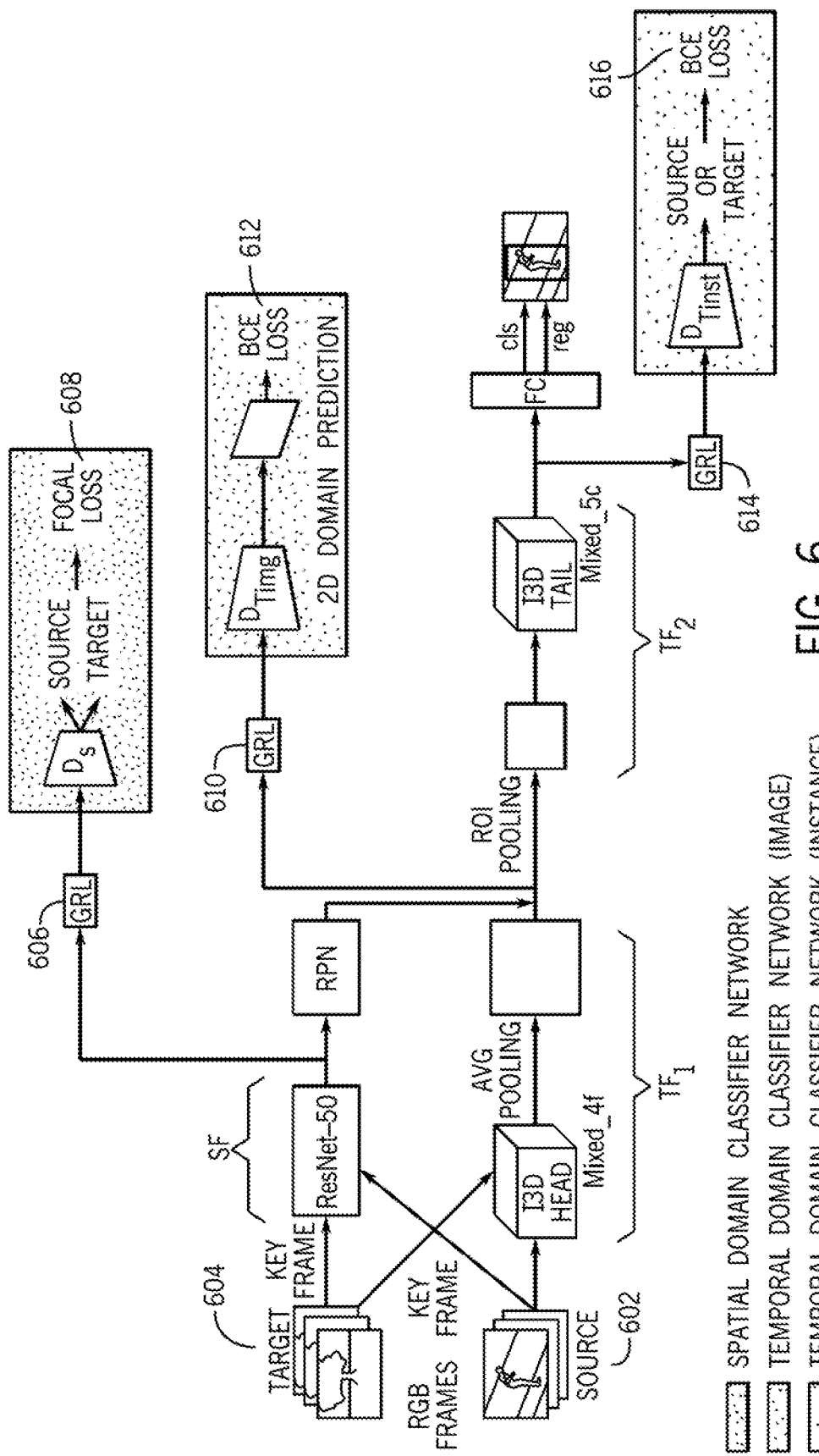
FIG. 6 is a schematic overview of a general processes executed by the domain adaption application according to an exemplary embodiment of the present disclosure.

FIG. 6 is a schematic overview of a general processes executed by the domain adaption application 106 according to an exemplary embodiment of the present disclosure. As shown, the data pertaining to the source domain 602 and the target domain 604 may be analyzed to determine respective key frames $K^s$ and $K^T$. The domain adaption application 106 uses the spatial domain classifier network $D_s$ to align the spatial features generated by the SF. The temporal features are adapted at the image and instance level using their respective domain classifier networks, i.e., $D_{T_{img}}$ and $D_{T_{inst}}$. As discussed above, the image level features are extracted by the feature extractor $TF_1$ and instance levels features are obtained from the feature extractor $TF_2$.

The GRL 606 may be utilized by the action localization module 130 to output the focal loss 608 associated with the action localization model. The GRL 610 may be utilized by the action classification adaption module 134 to output the BCE loss 612 associated with the alignment of temporal features at an image level. Additionally, the GRL 614 may be utilized by the action classification adaption module 134 to output the BCE loss 616 associated with the alignment of temporal features at an instance level. Accordingly, the distribution of both the spatial and temporal features of the source domain 602 and the target domain 604 are completed for adapting actor proposals and action classification respectively.

Figure 7:
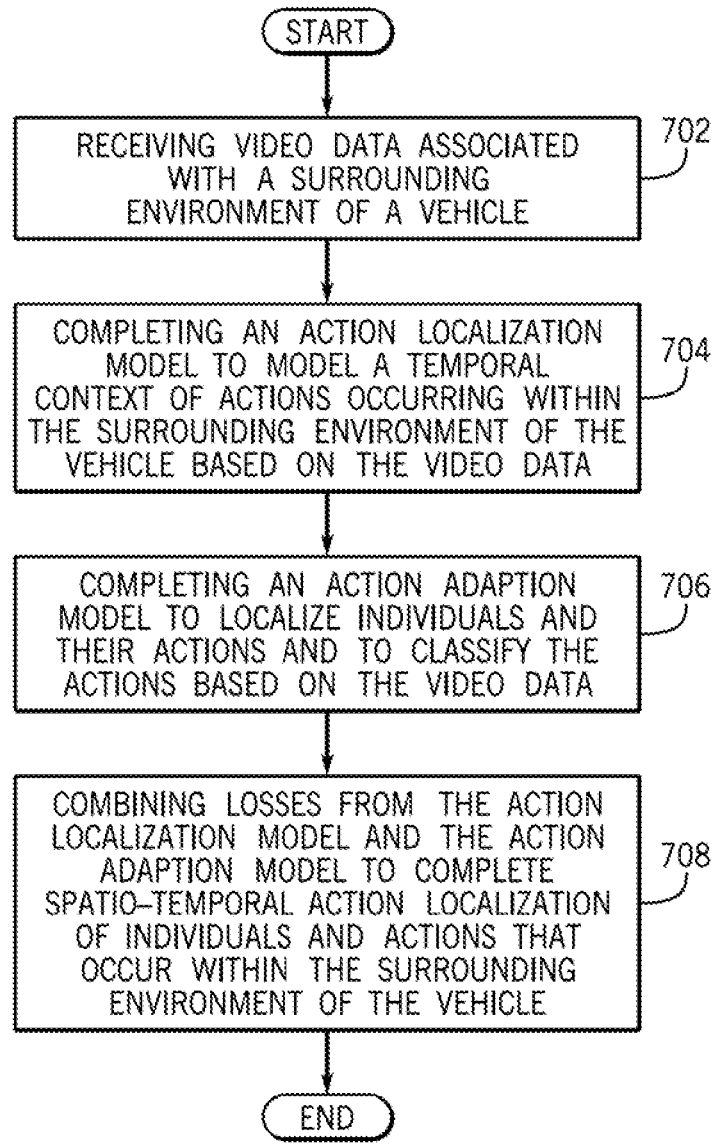
FIG. 7 is a process flow diagram of a method for providing unsupervised domain adaption for spatio-temporal action localization according to an exemplary embodiment of the present disclosure.

FIG. 7 is a process flow diagram of a method 700 for providing unsupervised domain adaption for spatio-temporal action localization according to an exemplary embodiment of the present disclosure. FIG. 7 will be described with reference to the components of FIG. 1 and FIG. 2 though it is to be appreciated that the method 700 of FIG. 7 may be used with other systems/components. The method 700 may begin at block 702 wherein the method 700 may include receiving video data associated with a surrounding environment of a vehicle 102. The method 700 may proceed to block 704, wherein the method 700 may include completing an action localization model to model a temporal context of actions occurring within the surrounding environment of the vehicle 102 based on the video data.

The method 700 may proceed to block 706, wherein the method 700 may include completing an action adaption model to localize individuals and their actions and to classify the actions based on the video data. The method 700 may proceed to block 708, wherein the method 700 may combining losses from the action localization model and the action adaption model to complete spatio-temporal action localization of individuals and actions that occur within the surrounding environment of the vehicle 102.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing unsupervised domain adaption for spatio-temporal action localization comprising:
   receiving video data associated with a surrounding environment of a vehicle;
   completing an action localization model to model a temporal context of actions occurring within the surrounding environment of the vehicle based on the video data;
   completing an action adaption model to localize individuals and their actions and to classify the actions based on the video data, wherein completing the action adaption model includes adapting actions at an image level by appending a temporal domain discriminator, wherein a loss function of an action classification image level is output with respect to adapting actions at the image level, wherein completing the action adaption model also includes adapting actions at an instance level by analyzing a feature vector associated with feature extractors to output a domain classification output for a region proposal in at least one image, wherein a loss function of an action classification instance level is output with respect to adapting actions at the instance level; and
   combining losses from the action localization model and the action adaption model to complete spatio-temporal action localization of individuals and actions that occur within the surrounding environment of the vehicle, wherein the losses are combined to determine an overall adversarial loss pertaining to domain adaptation, wherein the vehicle is autonomously controlled to operate based on the overall adversarial loss.

2. The computer-implemented method of claim 1, wherein receiving video data associated with the surrounding environment of the vehicle includes receiving video associated with a source domain and video associated with a target domain, wherein the source domain includes image data associated with various environments, wherein the target domain includes image data associated with the surrounding environment of the vehicle.

3. The computer-implemented method of claim 2, wherein completing the action localization model includes analyzing data associated with the source domain and the target domain and determining a key frame of the source domain and a key frame of the target domain, wherein an I3D convolutional neural network is utilized to generate a temporal feature representation using a feature extractor with respect to the key frame of the source domain and the key frame of the target domain.

4. The computer-implemented method of claim 3, wherein data associated with the key frame of the source domain and the key frame of the target domain is utilized to generate an action proposal using a spatial encoder on the key frames as inputs for a reason proposal network, wherein region of interest pooling is completed to obtain a fixed length representation of a particular size associated with localization of each individual in the source domain and the target domain.

5. The computer-implemented method of claim 3, wherein completing the action localization model includes outputting loss functions of the action localization model, wherein a gradient reversal layer is used to align spatial feature distribution between the source domain and target domain and the loss function of the action localization model are output.

6. The computer-implemented method of claim 5, wherein completing the action adaption model includes performing actor proposal adaption to generate actor proposals and localize a position of each individual in the source domain and the target domain, wherein loss functions are output for actor proposal adaption.

7. The computer-implemented method of claim 1, wherein combining the losses from the action localization model and the action adaption model includes combining the loss function of the action localization model, the loss function of the action classification image level, and the loss function of the action classification instance level to determine the overall adversarial loss, wherein the spatio-temporal action localization of individuals and actions is completed to autonomously control the vehicle based on localized actors.

8. A system for providing unsupervised domain adaption for spatio-temporal action localization comprising:
a memory storing instructions when executed by a processor cause the processor to:
receive video data associated with a surrounding environment of a vehicle;
complete an action localization model to model a temporal context of actions occurring within the surrounding environment of the vehicle based on the video data;
complete an action adaption model to localize individuals and their actions and to classify the actions based on the video data, wherein completing the action adaption model includes adapting actions at an image level by appending a temporal domain discriminator, wherein a loss function of an action classification image level is output with respect to adapting actions at the image level, wherein completing the action adaption model also includes adapting actions at an instance level by analyzing a feature vector associated with feature extractors to output a domain classification output for a region proposal in at least one image, wherein a loss function of an action classification instance level is output with respect to adapting actions at the instance level; and
combine losses from the action localization model and the action adaption model to complete spatio-temporal action localization of individuals and actions that occur within the surrounding environment of the vehicle, wherein the losses are combined to determine an overall adversarial loss pertaining to domain adaptation, wherein the vehicle is autonomously controlled to operate based on the overall adversarial loss.

9. The system of claim 8, wherein receiving video data associated with the surrounding environment of the vehicle includes receiving video associated with a source domain and video associated with a target domain, wherein the source domain includes image data associated with various environments, wherein the target domain includes image data associated with the surrounding environment of the vehicle.

10. The system of claim 9, wherein completing the action localization model includes analyzing data associated with the source domain and the target domain and determining a key frame of the source domain and a key frame of the target domain, wherein an I3D convolutional neural network is utilized to generate a temporal feature representation using a feature extractor with respect to the key frame of the source domain and the key frame of the target domain.

11. The system of claim 10, wherein data associated with the key frame of the source domain and the key frame of the target domain is utilized to generate an action proposal using a spatial encoder on the key frames as inputs for a reason proposal network, wherein region of interest pooling is completed to obtain a fixed length representation of a particular size associated with localization of each individual in the source domain and the target domain.

12. The system of claim 10, wherein completing the action localization model includes outputting loss functions of the action localization model, wherein a gradient reversal layer is used to align spatial feature distribution between the source domain and target domain and the loss function of the action localization model are output.

13. The system of claim 12, wherein completing the action adaption model includes performing actor proposal adaption to generate actor proposals and localize a position of each individual in the source domain and the target domain, wherein loss functions are output for actor proposal adaption.

14. The system of claim 8, wherein combining the losses from the action localization model and the action adaption model includes combining the loss function of the action localization model, the loss function of the action classification image level, and the loss function of the action classification instance level to determine the overall adversarial loss, wherein the spatio-temporal action localization of individuals and actions is completed to autonomously control the vehicle based on localized actors.

15. A non-transitory computer readable storage medium storing instructions that when executed by a computer, which includes a processor perform a method, the method comprising:
- receiving video data associated with a surrounding environment of a vehicle;
- completing an action localization model to model a temporal context of actions occurring within the surrounding environment of the vehicle based on the video data;
- completing an action adaption model to localize individuals and their actions and to classify the actions based on the video data, wherein completing the action adaption model includes adapting actions at an image level by appending a temporal domain discriminator, wherein a loss function of an action classification image level is output with respect to adapting actions at the image level, wherein completing the action adaption model also includes adapting actions at an instance level by analyzing a feature vector associated with feature extractors to output a domain classification output for a region proposal in at least one image, wherein a loss function of an action classification instance level is output with respect to adapting actions at the instance level; and
- combining losses from the action localization model and the action adaption model to complete spatio-temporal action localization of individuals and actions that occur within the surrounding environment of the vehicle, wherein the losses are combined to determine an overall adversarial loss pertaining to domain adaptation, wherein the vehicle is autonomously controlled to operate based on the overall adversarial loss.

16. The non-transitory computer readable storage medium of claim 15, wherein combining the losses from the action localization model and the action adaption model includes combining a loss function of the action localization model, a loss function of an action classification image level, and a loss function of an action classification instance level to determine the overall adversarial loss, wherein the spatio-temporal action localization of individuals and actions is completed to autonomously control the vehicle based on localized actors.

* * * * *